Feb. 11, 1958 R. C. WILLIAMS 2,823,079
TRACK ROLLER ASSEMBLY
Filed Sept. 14, 1954 2 Sheets-Sheet 1
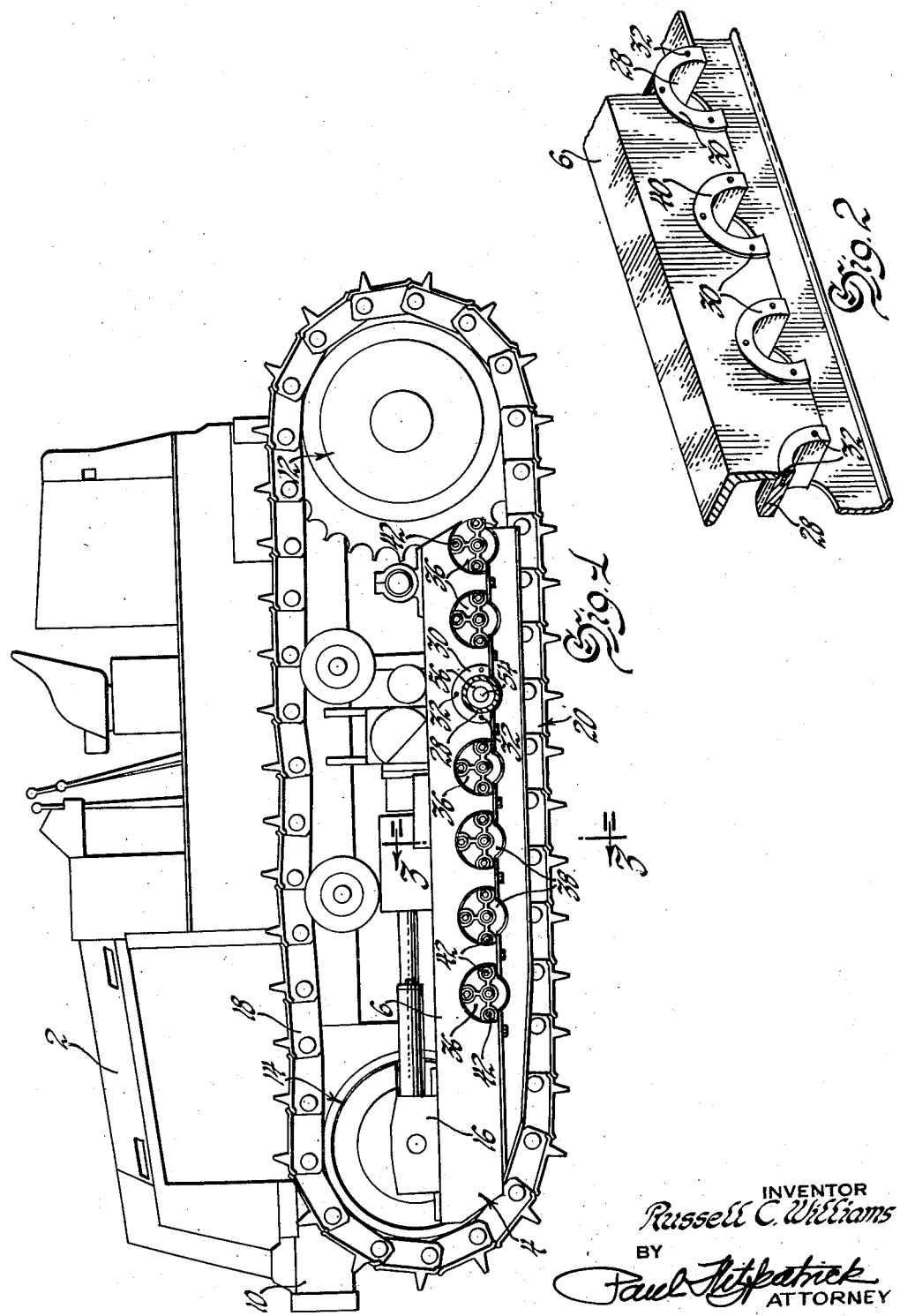
INVENTOR
Russell C. Williams
BY
Paul Fitzpatrick
ATTORNEY Feb. 11, 1958  R. C. WILLIAMS  2,823,079
TRACK ROLLER ASSEMBLY
Filed Sept. 14, 1954  2 Sheets-Sheet 2

INVENTOR
Russell C. Williams
BY
Paul Fitzpatrick
ATTORNEY

United States Patent Office 2,823,079
Patented Feb. 11, 1958

2,823,079

TRACK ROLLER ASSEMBLY

Russell C. Williams, Rocky River, Ohio, assignor to General Motors Corporation, Detroit, Mich., a corporation of Delaware Application September 14, 1954, Serial No. 456,000

8 Claims. (Cl. 305—9)

This invention relates to tracked vehicles and more particularly to supporting structures for endless ground engaging tracks of crawler tractors.

Tracked vehicles, such as crawler tractors, conventionally employ rigid track supporting frame structures having connected thereto a plurality of longitudinally spaced track roller assemblies which provide rolling contact for the ground engaging portion of the endless tracks. Such rollers are usually mounted on roller or ball bearing assemblies to reduce rolling friction. In the past bearing assemblies have customarily been press fitted into axial bores in the rollers which were aligned in the vertical planes of the track engaging peripheral portions of the rollers. During operation of the vehicle these rollers must not only absorb severe loads and shock resulting from the great weight of the vehicle but also are subjected to constant hammering by the individual links of the track. This hammering produces a peening or stretching effect which enlarges both the outside and the inside diameter of the roller. Since enlargement of the inside diameter of the roller causes the bearing assemblies to become loose, frequent replacement of the roller assemblies is required.

In addition to the severe load imposed on the track roller bearing assemblies, it has been extremely difficult in the past to maintain the cages or bearing supports for the rollers securely in position on the track frames. Usually bearing supporting structures have been bolted directly to the flat under-surface of the track frames. As a result, all tensile loading or longitudinal thrust on the bearing supports was resisted only by the attaching bolts.

An object of the present invention is to provide a track roller assembly having bearing structures arranged in a manner whereby the effect of hammering by the track links on the periphery of the rollers produces no appreciable loosening of the bearings or bearing supports.

Another object is to provide a track roller assembly wherein the roller support bearings are carried in laterally aligned cap structures which in turn are supported on the under-side of parallel longitudinally extending track frame members, the track rollers being provided with integral axial stub shafts adapted for insertion in the inner races of the bearings.

A further object is to provide a structure of the stated character wherein annular lubricant chambers are provided which surround the bearings, there being a common communicating passage between the chambers permitting simultaneous charging of both chambers from either end of the roller assembly.

Still another object is to provide a track frame structure having laterally aligned longitudinally spaced recessed portions formed therein for receiving the roller supporting structures, whereby longitudinal thrust on the supporting structures is absorbed by the track frame rather than the mounting bolts.

Yet another object is to provide a track roller assembly which may be temporarily coupled together for shipping purposes.

These and other objects and advantages of the invention will become more fully apparent as reference is had to the accompanying specification and drawings wherein:

Fig. 1 is a side elevational view of a crawler tractor showing the form and location of the track frame and the associated track roller support members.

Fig. 2 is a fragmentary perspective view of a portion of the track frame illustrating the form and location of the semi-circular recesses in which the track roller supports or cages are received.

Figure 3:
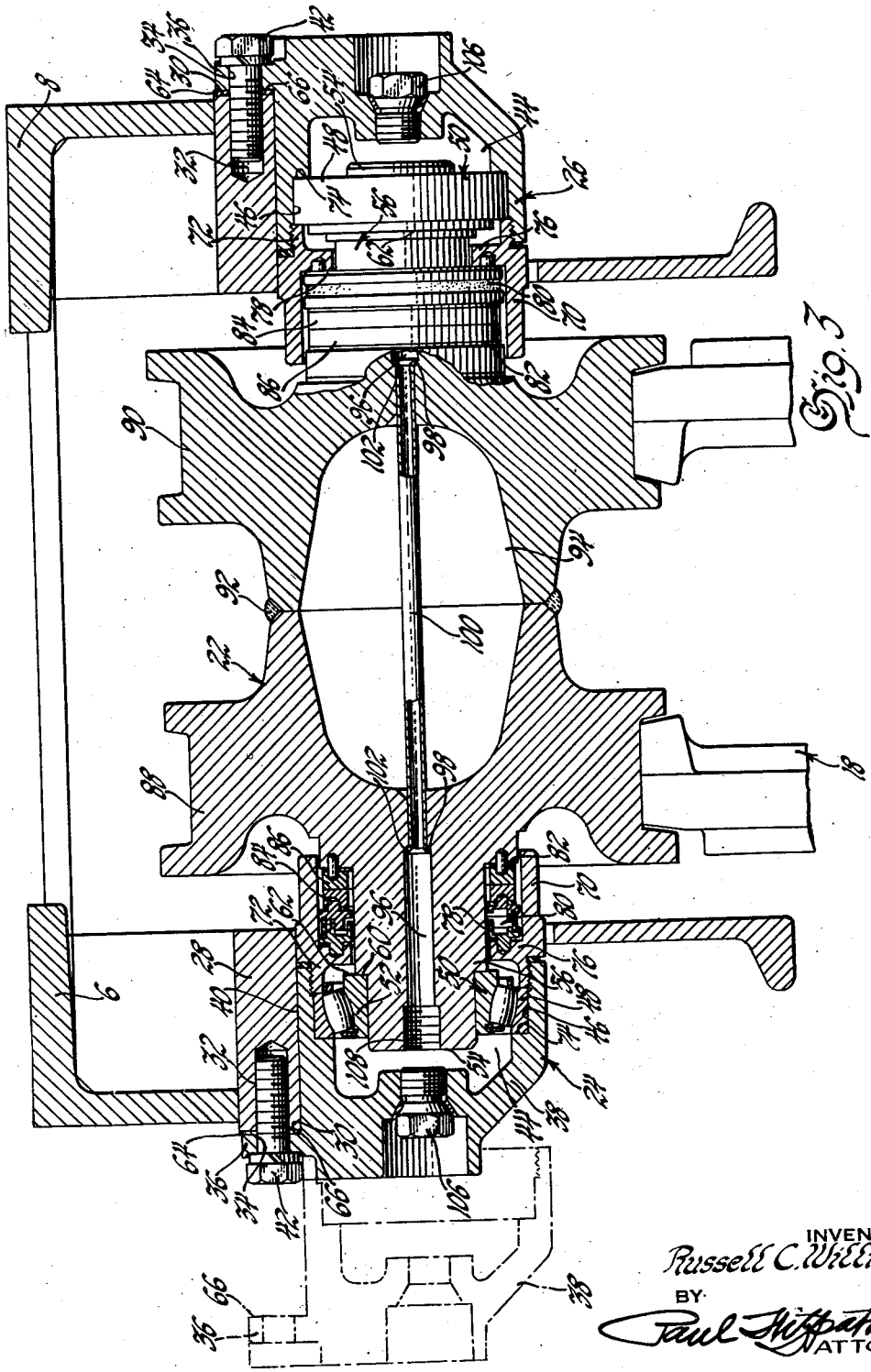
Fig. 3 is a rear sectional elevational view, looking in the direction of arrows 3—3 of Fig. 1 showing the details of construction of the track roller assembly.

Referring now to the drawings, and particularly Fig. 1, there is illustrated the left side of a crawler tractor 2. It will be understood that the right side of crawler tractor 2 is identical with the left side and that the following description is therefore equally applicable to both sides of the vehicle. Reference character 4 designates generally a track supporting frame structure comprising side members 6 and 8 which extend longitudinally of the vehicle at each side thereof. Frames 6 and 8 are rigidly secured together in spaced apart parallel relation and are secured to frame 10 by any suitable means. For a complete description of the preferred means of attaching the track frames to the tractor frame, reference may be had to the co-pending application of R. C. Williams et al. entitled "Crawler Tractor," S. N. 455,903, filed September 14, 1954, assigned to General Motors Corporation. Immediately rearwardly adjacent track frames 6 and 8 there is provided a driving sprocket 12 which is rotatably supported on tractor frame 10. At the forward end of the vehicle an idler wheel 14 is disposed between tracks 6 and 8 and is slidably supported thereon by idler wheel supporting structure 16. An endless track 18 extends around and operatively engages drive sprocket 12 and idler wheel 14. To rotatably support the intermediate ground engaging portion 20 of track 18, there are provided a plurality of longitudinally spaced transversely extending track rollers 22. Each roller 22 is secured between rails 6 and 8 by means of roller support assemblies 24 and 26. Assemblies 24 and 26 are respectively secured in downwardly facing semi-circular recessed wall portions 28 (Fig. 2) formed at spaced intervals along the lower surface of each of rails 6 and 8. Recesses 28 are preferably formed by notching the track frame at intervals and welding individual curved plates therein. However, it will be understood that the curved wall section may also be formed integrally as by forging.

As seen best in Fig. 2 the outwardly facing edges 30 of semi-circular portions 28 are provided with a plurality of laterally directed threaded apertures 32. Apertures 32 are adapted for alignment with similar apertures 34 formed in the flanges 36 of bearing cages or cap structures 38. Thus the semi-circular outer peripheral wall 40 of the main body of cap structures 38 slidably interfits in semi-circular opening defined by wall 28 and is retained therein by means of bolts 42 which extend through apertures 34 into threaded apertures 32, previously mentioned. It will be apparent that the recessed relation of the cap structures 38 substantially improves the rigidity of mounting and appreciably reduces the possibility of loosening or shifting thereof as a result of severe impact and loads imposed on rollers 22 by endless track 18. Because of this construction, virtually all impact on cap structures 38 is absorbed by the track frames 6 and 8, rather than by the mounting bolts 42, whereas in the prior art, because the cap structures have been bolted to the flat under-surface of the track frames, longitudinal thrust imposed on the cap structures has necessarily been absorbed entirely by the cap mounting bolts.

As seen best in Fig. 3 each of the cap structures 38 is formed with an inwardly directed annular cavity 44 having a counterbore 46 formed therein which is adapted to receive the outer race 48 of a roller bearing assembly 50. The inner race 52 of bearing 50, in turn, is adapted to receive the reduced outer end portion 54 of integral stub shaft 56. When in assembled relation, the shoulder 60 formed at the inner extermity of reduced portion 54 engages the inner edge face 62 of inner bearing race 52. Therefore, by inserting suitable shims 64 between the inner face 66 of flanges 36 and the outer face 30 of recesses 24, the roller assembly may be quickly and easily adjusted to control the permissible degree of axial oscillation of roller 22.

Disposed in surrounding relation with the intermediate portion of stub shaft 56 is an annular sleeve member 70 having an externally threaded forward end 72 which is adapted for threaded engagement with the internally threaded rearward edge 74 of cap structure 38. Upon threading of the annular member 70 into cap structure 38 by a suitable wrench, the outer bearing race 48 is rigidly locked in bore 46 and tightly against the shoulder 74 adjacent thereto. It will thus be seen that roller bearing assembly 50 may be easily and quickly locked rigidly in engagement with cap structure 38 yet is susceptible to removal therefrom with a minimum of effort.

To provide a lubricant tight seal between rotating stub shaft 56 and the annular chamber 44 formed in cap structure 38, annular member 70 is provided with an integral intermediate radially inwardly directed flange 76. At its inner peripheral wall 78, flange 76 engages a resilient annular grease seal structure 80 which is disposed in the annular cavity between flange 76 and the outer shoulder 82 formed at the juncture of stub shaft 56 and roller 22. Flexible annular seal 80 in turn operatively engages a hardened annular ring 84 which rotatably engages a second hardened annular ring 86 connected for rotation with roller 22.

As will be apparent from Fig 3, roller 22 is fabricated from two reversely similar forgings 88 and 90 which are welded together at 92. Accordingly, roller 22 has formed interiorly thereof a relatively large cavity 94. Since it is very difficult as well as time consuming to individually lubricate each bearing assembly for the numerous roller assemblies provided, it is desirable that means be provided for simultaneously charging the lubricant cavities 44 at opopsite sides of each roller. Therefore, in accordance with another feature of the invention, each stub shaft 56 is formed with a concentric axial passage 96 which communicates with the interior of cavity 94. At their inner extremities, passages 96 are reduced in dimension to provide inclined shoulders 98. A thin wall tubing 100 is then disposed to extend between the respective passages 96. The outer edges 102 of tube 100 are thereafter flared out to provide lubricant tight communication between each of passages 96 and prevent the discharge of lubricant into cavity 94.

To charge both cavities 44 with lubricant it is only necessary to remove threaded plug 106 from either of cap structures 38 and insert a suitable grease gun connection. It will be apparent that upon completely filling one of the cavities 44, further entrance of grease will be directed from one passage 96 into tubing 100, through the opposite passage 96 and ultimately into the opposite cavity 44.

In addition to the numerous structural advantages of the invention, it is particularly important to note that the entire roller assembly is ideally adapted for temporary assembling for shipping purposes. Thus, in order to temporarily assemble the roller and adjacent bearing and cap structures, it is only necessary to remove the plugs 106 and insert machine bolts, not shown, of length and size suitable to engage the internally threaded outer ends 108 of passages 96. In this way entire replacement assemblies may be maintained in assembled relation for convenient shipping. It should also be noted that bearing 50 may be conveniently removed by substituting a long bolt for the plug 106.

From the foregoing it will be seen that a novel and highly efficient track roller assembly has been provided. In addition to the numerous advantages previously referred to, the present construction greatly increases the operational life of the bearings 50, since the hammering or peening effect on the peripheral surface of roller 22 has less tendency to enlarge the internal bore 46 of cap structures 38.

While but one embodiment of the invention has been shown and described, it will be apparent that numerous changes and modifications may be made therein. It will therefore be understood that it is not intended to limit the invention to the embodiment shown but only by the scope of the claims which follow.

I claim:

1. In a crawler tractor having endless ground engaging tracks, a supporting structure for said tracks comprising a pair of spaced apart longitudinally extending frames rigidly connected together, a plurality of track engaging rollers disposed between said frames, bearing means for said rollers, supporting means for said bearings, means forming recesses in said frames, said supporting means being disposed in interfitting recessed relation in said recesses and means for positively adjusting each of said supporting means transversely of said frames.

2. In a crawler tractor having endless ground engaging tracks, a supporting structure for said tracks comprising a pair of spaced apart longitudinally extending frame members rigidly connected together, a plurality of track engaging rollers disposed between said frames for rotation about a transverse axis, bearing means for said rollers, supporting means for said bearings, said supporting means being substantially recessed in said frames so that thrust forces on said bearings are directed linearly to said frames.

3. A track frame for a vehicle having endless ground engaging tracks and a plurality of track engaging rollers rotatably supported by laterally spaced cylindrical bearing assemblies, said frame comprising a longitudinally extending member of generally L-shaped cross-section, means forming a plurality of longitudinally spaced semicircular notches in a wall of said member, a transversely extending semi-circular plate rigidly secured in each of said recesses and adapted to surround the major portion of said bearing assemblies, and means formed in the arcuate side edge of said plate for securing said bearing assemblies in nesting relation with said semi-circular plates.

4. A track roller assembly for a tracked vehicle comprising a track roller, integral stub axle shafts formed in axial alignment at opposite sides of said roller, a pair of bearings, a pair of endwise adjustable supporting members, and threadable means engaging said bearings to retain the latter in said supporting members.

5. A track roller assembly comprising a track roller having a flanged outer periphery, a pair of axially aligned stub shafts formed on said roller in concentric relation therewith, a bearing assembly surroundingly engaging each of said stub shafts, a pair of bearing support structures, threaded means engaging said bearings to retain the latter in said supporting structures, means forming an annular chamber adjacent said bearings, and an annular rotary seal disposed between said support and said roller, and means for injecting lubricant into said annular chambers.

6. In a roller assembly, a rotatable roller having integral stub shafts axially extending therefrom, bearing means for said roller, said bearing means comprising inner and outer races having anti-friction members disposed therebetween, said inner race being adapted for press fitted engagement over said stub shafts, a pair of bearing support members, said outer race being adapted for interfitting relation within said bearing supports, threadable means engaging said outer race to lock the latter rigidly relative to said supports, means forming annular cavities in said supports at one side of said bearings, rotary seal means disposed between said roller and the other side of said bearings, means forming a pair of axially aligned bores in said stub shafts, tubular means conecting said axially aligned bores, and a grease injection opening formed in each of said supporting members whereby each of said bearings may be charged from either of said grease injecting openings.

7. In a bearing, a shaft element, a housing surrounding said shaft element in radially spaced relation thereto, an anti-friction bearing disposed on said shaft, said bearing comprising an inner and outer race having anti-friction elements disposed therebetween, a threaded ring locking said outer race rigidly relative to said housing, closure means for the space between said shaft and said housing including a rotary seal at the axially inner side of said anti-friction bearings and an end closure at the axially outer side of said housing to provide a lubricant chamber for said bearing, and a lubricant injecting aperture formed in said axially outer side.

8. In a bearing, a shaft element having an exterior annular shoulder, a housing surrounding said shaft element in radially spaced relation thereto and having an internal annular shoulder, an anti-friction bearing disposed between said shaft and housing, said bearing comprising an inner and outer race ring seated respectively against said shaft shoulder and housing shoulder and having anti-friction elements disposed therebetween, a ring threadably engaging said housing and abutting said outer race ring to rigidly lock the latter relative to said housing, closure means for the space between said shaft and said housing including a rotary seal at the axially inner side of said anti-friction bearings, an end closure at the axially outer side of said housing to provide a lubricant chamber for said bearing, and a lubricant injecting aperture formed in said closure at the axially outer side.

References Cited in the file of this patent

UNITED STATES PATENTS

| | | |
|---|---|---|
| 1,796,533 | Pearson | Mar. 17, 1931 |
| 2,690,933 | Bechman | Oct. 5, 1954 |